INVENTOR.
HAROLD W. STRAAT

Feb. 6, 1962 H. W. STRAAT 3,019,707
FINE ADJUSTMENT MECHANISM FOR MICROSCOPES
Filed May 13, 1959 2 Sheets-Sheet 2
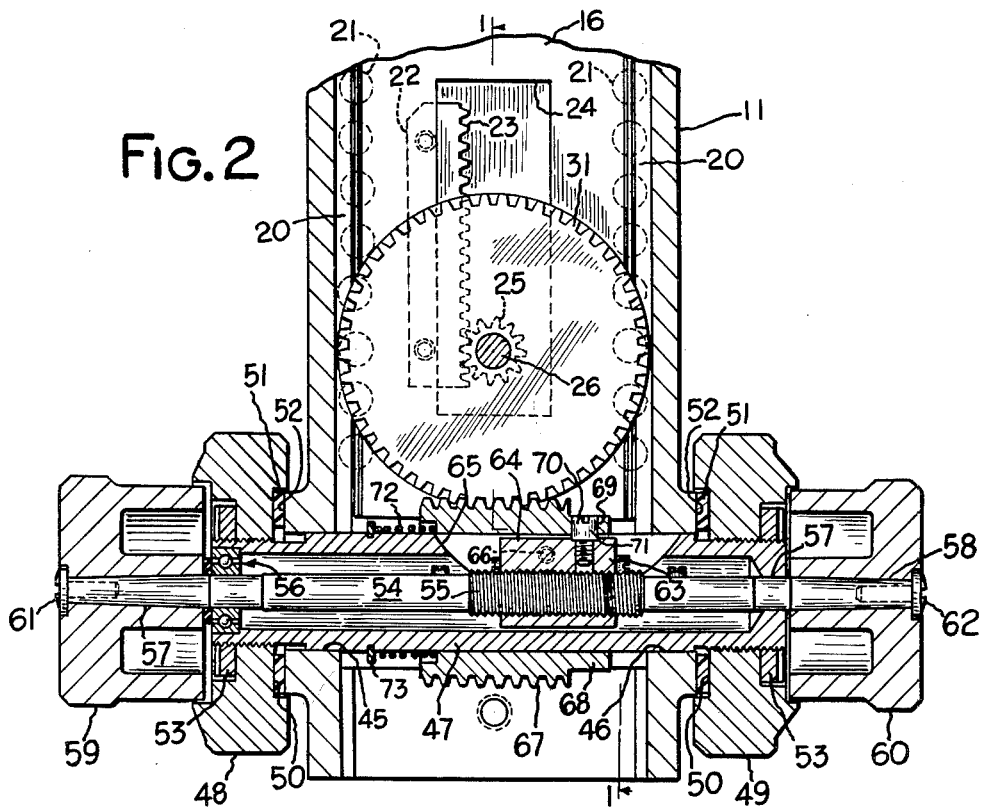
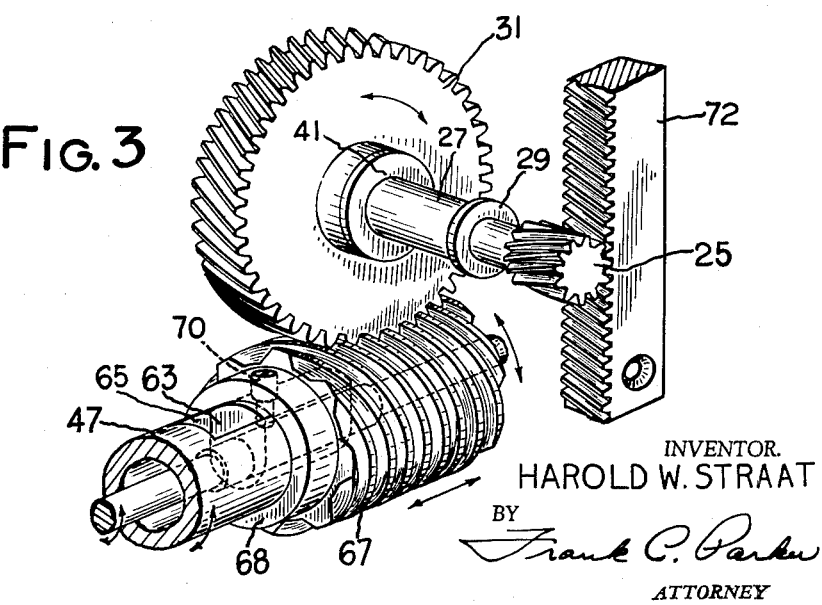
INVENTOR.
HAROLD W. STRAAT
BY
Frank C. Parker
ATTORNEY

United States Patent Office 3,019,707
Patented Feb. 6, 1962

3,019,707
FINE ADJUSTMENT MECHANISM
FOR MICROSCOPES
Harold W. Straat, Irondequoit, N.Y., assignor to Bausch
& Lomb Incorporated, a corporation of New York
Filed May 13, 1959, Ser. No. 812,839
1 Claim. (Cl. 88—39)

This invention relates to microscopes and more particularly to a novel adjustment mechanism therefor.

One of the principal objects of the present invention is to provide an improved adjusting mechanism and particularly the fine adjusting mechanism for microscopes which is simple in structure, neat in appearance, economical to manufacture and efficient in operation.

A further object of the present invention is to provide a microscope adjusting mechanism wherein the fine adjusting mechanism is mounted coaxially with respect to and concentrically within the coarse adjusting mechanism.

A further and more detailed object of the present invention is to provide a microscope adjusting mechanism including meshing worm and pinion means wherein the worm is rotated by manually actuated knob means for effecting the coarse adjustment and wherein a threaded nut disposed coaxially within the worm gear is actuated by separate manually operable knob means in order to effect axial movement of the worm gear and thereby the fine adjustment of the microscope.

The present invention is illustrated herein as being applicable to a microscope having a vertically reciprocable specimen mounting stage, but it will be understood that the coarse and fine adjusting mechanism could be equally applicable to microscopes wherein the optical elements or lens members are reciprocable while the specimen mounting stage remains stationary.

The foregoing objects and numerous advantages of the present invention will become more apparent from the following detailed description when read in conjunction with the accompanying drawings wherein:

FIG. 2 is a fragmentary sectional view taken at right angles to the view in FIG. 1 and illustrating other features of the present invention; and FIG. 3 is a perspective view illustrating the cooperable worm and pinion gears, as well as the cooperable pinion and rack means utilized in the adjusting mechanism comprising the subject matter of the present invention.

Figure 1:
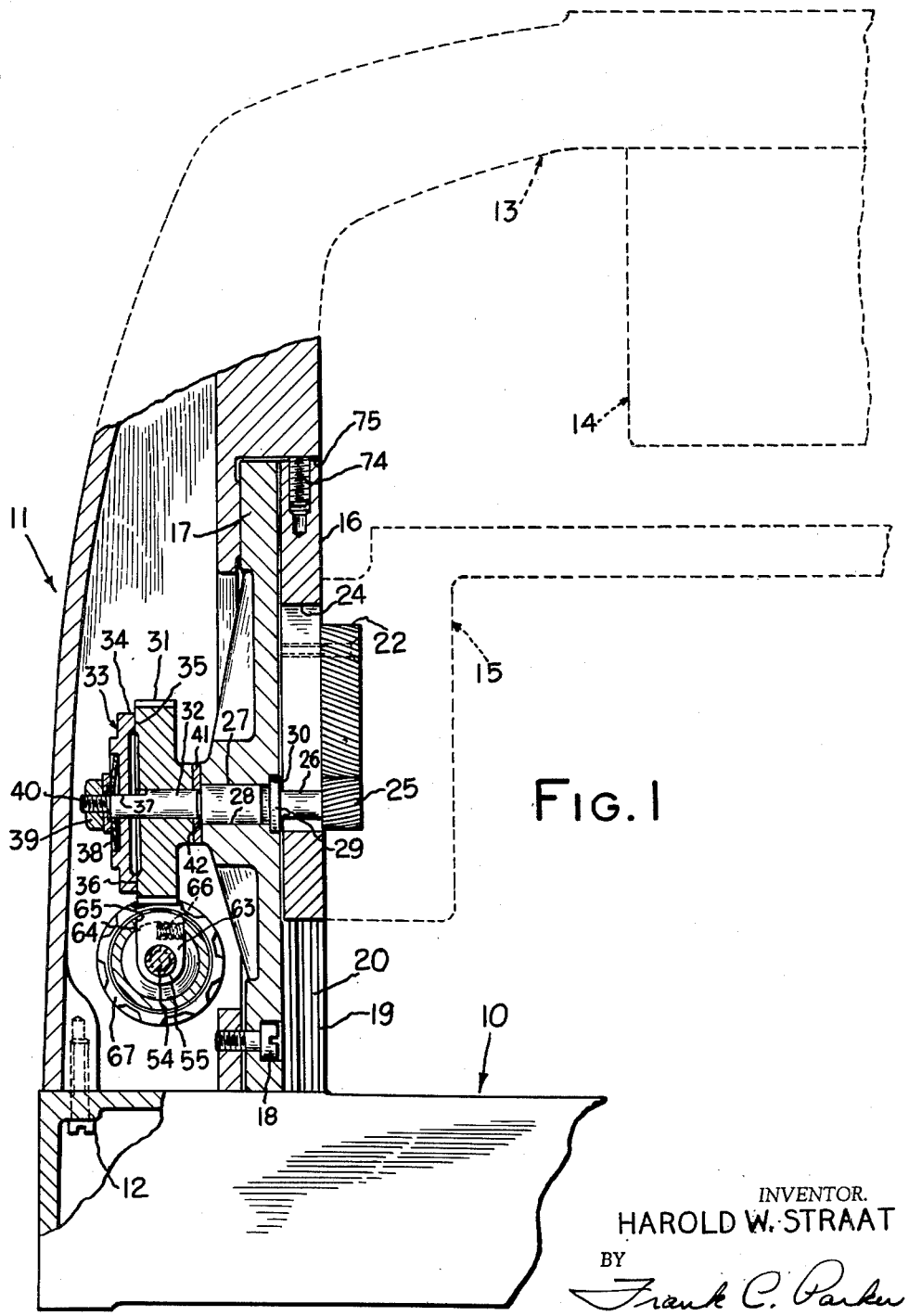
FIG. 1 is a fragmentary side elevational view of a microscope stand showing the principal features of the present invention.

A preferred embodiment of the present invention is illustrated, and in the several views, like reference numerals have been used to identify identical parts. With reference particularly to FIG. 1, the microscope disclosed comprises a supporting base, indicated generally by reference numeral 10, to which is secured a main frame or supporting frame, identified generally by reference numeral 11. The supporting or vertical frame member 11 is secured to the base 10 by means of a plurality of screws 12, only one of which is shown. The vertically extending frame member 11 is formed with an arm portion 13 which may extend generally at right angles to the vertical portion 11 in order to support the optical elements or lens members, indicated schematically by reference numeral 14.

The optical elements 14 are disposed in optical alignment with a specimen mounting stage, the latter being illustrated herein in dotted lines and being represented by reference numeral 15 inasmuch as the precise details of the stage 15 are not peculiarly important to the present invention.

The specimen mounting stage 15 is reciprocably mounted in order to enable the optical adjustment necessary to bring a sharp image into the view of an operator looking through the optical system 14. The stage 15 is thus rigidly secured to a slide member 16 by any well-known means.

A plate 17 is fixed to the vertical supporting member 11 by means of a plurality of screws 18 and a pair of track carrying guide members 19 are secured to plate 17 by means of a plurality of screws (not shown). The slide 16 is preferably provided with tracks on either side similar to tracks 20 on the insides of guide members 19, and a plurality of ball bearing elements 21 are preferably disposed between the tracks 20 and the tracks on either side of the slide member 16 in order to facilitate free vertical reciprocatory movement of the slide 16 relative to the vertical supporting frame 11. Cage means for maintaining the proper vertical spacing between the ball bearings 20 may also be utilized, if desired.

A rack 22 is bolted to the slide 16 and is provided with a toothed portion 23 which projects beyond an opening 24 in the slide 16 and is disposed in mesh with the teeth of a pinion gear 25 affixed to one end of a shaft 26. The opening 24 enables movement of the slide 16 with respect to the frame member 11, inasmuch as the shaft 26 projects through the opening 24 in the slide member 16. The shaft 26 is rotatable within plate 17 and is provided with a bearing portion 27 which affords smooth rotation within a corresponding bearing portion 28 of plate 17. A washer 29 may be provided around the shaft 26 so as to abut a shoulder 30 of plate 17 in order to prevent movement of the shaft 26 to the left (as viewed in FIG. 1).

A driving pinion gear 31 is rotatably mounted upon a reduced portion 32 of the shaft 26, there being a rather snug running fit between the inner bearing surface of the pinion gear 31 and the reduced portion 32 of the shaft 26. Friction clutch means are provided for drivingly connecting the pinion gear 31 to the shaft 32 and such friction clutch means comprises a disk member 33 having an axially projecting flange portion 34 formed with a side face 35 cooperable with a complementary side face 36 on the pinion gear 31 to effect a drive between the gear 31 and the shaft 32. The friction clutch member 33 is keyed to the shaft 32 by means of a D-shaped portion 37 at the end of shaft 26. The friction clutch member 33 is held in frictional engagement with gear 31 by means of a spring washer 38 disposed between the clutch member 33 and a nut 39 threaded onto the end of a threaded portion 40 of shaft 26. The spring washer 38 forces the clutch member 33 to the right and, in turn, this forces the gear member 31 to the right against a washer 41 which is disposed so as to engage an abutment shoulder 42 on the end of the enlarged bearing portion 27 of shaft 26. The washer 41 and the abutment ring 29 thus eliminate the axial freedom of the shaft 26 within the plate 17 but nevertheless permit free rotation of the shaft 26 within the plate member 17.

The frame member 11 is formed with aligned openings providing bearing surfaces 45 and 46 for rotatably mounting a sleeve shaft 47. A pair of coarse adjusting knobs 48 and 49 are threadedly disposed on either end of the sleeve shaft 47 and are formed with shoulder portions 50 which are adapted to engage friction rings 51. The friction rings 51 are also disposed in abutment with shoulders 52 which are formed on the frame member 11. The friction rings 51 are arranged to permit rotation of the sleeve shaft 47 but are arranged to resist free rotation thereof. In other words, the coarse adjusting knobs 48 and 49 must be forced slightly in order to overcome the friction afforded by the rings 51. When the proper degree of friction between the adjusting knobs 48 and 49 and the cooperating surfaces of the frame member 11 is reached, a pair of lock nuts 53 are turned into tight engagement with the coarse adjusting knobs 48 and 49, respectively, in order to retain the coarse adjusting knobs in fixed position on the sleeve shaft 47.

A fine adjusting shaft 54, having a threaded portion 55 thereon substantially intermediate its ends, is rotatably mounted concentrically within the sleeve shaft 47. The screw shaft 54 is held in alignment within the sleeve shaft 47 by means of bearing members 56 and 57. The bearing members 56 may be ball bearing elements, as illustrated at the left hand of the sleeve shaft 47, or may be sleeve bearings, as indicated at the right hand of the sleeve shaft 47. Each end of the screw shaft 54 is tapered slightly, as indicated at 57 and 58, for receiving fine adjusting knobs 59 and 60 thereon. The fine adjusting knobs 59 and 60 are each provided with a complementary tapered interior portion for engagement respectively with the exterior tapers 57 and 58 on the shaft 54. A pair of screws 61 and 62 are respectively threaded into the ends of the shaft 54 to retain the fine adjusting knobs 59 and 60 in fixed position on the shaft 54.

A follower nut 63 is threaded onto the shoulder portion 55 of the shaft 54 and is enlarged at one side, as indicated at 64, for projection through a slot 65 in the sleeve shaft 47. There is sufficient clearance between the nut 64 and the slot 65 to provide a sliding fit therebetween and a small compression spring 66 is disposed within a suitable opening formed in the nut 64 and adapted to abut one side of the slot 65 in order to minimize backlash of the nut 64 within the slot 65.

A worm gear 67 is mounted on the sleeve shaft 47 and is free to slide coaxially therealong. The worm gear 67 is provided with an axially extending flange 68 which is formed with an aperture 69 therein for the reception of a head 70 of a screw 71 threaded into a suitable opening in the nut 63. Thus, the nut 63 and the worm gear 67 are disposed substantially fixed with respect to each other. A compression spring 72 is disposed between the opposite end of the worm gear 67 and a stop washer or lock ring 73 in order to afford slight resistance to movement of the worm 67 to the left, as viewed in FIG. 2.

In the operation of the adjustment mechanism disclosed in the present invention, rotation of either the coarse adjusting knob 48 or 49 is slightly resisted by the friction rings 51. Rotation of the knobs 48 or 49, however, rotates the sleeve shaft 47 and due to the projection of the nut 63 through the slot 65 in the sleeve shaft 47, the worm gear 67 is caused to rotate directly with the sleeve shaft 47. The worm gear 47, being in mesh with driving pinion 31, causes the shaft 26 to rotate, due to the engagement of the friction clutch surfaces 34 and 35 and the pinion 25 at the end of the shaft 26 affords vertical movement of the rack 22 and consequent adjusting movement of the stage 15 relative to the optical elements 14 of the microscope. The just-described adjustment of the stage 15 is the coarse adjustment and is controlled by coarse adjusting knobs 48 and 49.

When the stage 15 is approximately optically adjusted and it is desired to effect fine adjustment thereof, one or the other of the fine adjusting knobs 59 or 60 is rotated in the desired direction in order to effect rotation of the threaded portion 55 on the screw shaft 54. This causes the nut 63 to move axially and, in turn, the worm gear 67 follows the nut. The axial movement of the worm gear 67 effects slight rotation of the driving pinion gear 31 and thus enables the fine adjustment of the rack 22 and the stage 15.

A set screw 74 is threaded into a threaded opening in the upper end of the slide 16 and is adapted to abut a downwardly facing shoulder 75 on the frame member 11 when the slide 16 has been moved to the desired upper limit of its movement. Thus, the friction clutch 34—35 merely slips, when the slide 16 is moved either to its upper or its lower limit of movement, upon the further rotation of either of the coarse adjusting knobs 48 and 49 or the fine adjusting knobs 59 and 60. The slippage of the friction clutch 34—35 prevents any damage to the adjusting mechanism even though the slide is in one or the other of its limit positions.

From the foregoing description, it is apparent that the present invention provides a simple and convenient adjusting mechanism for a microscope. It is contemplated that numerous changes and modificaitons may be made in the present invention without departing from the spirit or scope thereof.

What is claimed is:

In a microscope comprising a supporting frame carrying optically aligned lens and stage members and having at least one of said members movable relative to the other, a slide reciprocably mounted on said frame and having said one of said members directly secured thereto, a rack carried by said slide, a shaft rotatably mounted with respect to said frame, a pinion mounted on said shaft and disposed in mesh with said rack for drivingly interconnecting said rack and said shaft, a driving pinion having helical teeth and rotatably mounted on said shaft, a friction clutch comprising a spring biased disc mounted on and driven by said shaft and engaging an adjacent face of said driving pinion for drivingly interconnecting said driving pinion and shaft, a helical worm gear in mesh with said driving pinion teeth, said worm gear being slidably mounted on a hollow shaft carried by said frame, said hollow shaft including means defining an axially extending slot, a screw shaft concentrically mounted within said hollow shaft, a follower nut threadedly disposed on said screw shaft and projecting through said hollow shaft slot and interconnected with said worm gear such that the latter is free to slide axially along said hollow shaft with said nut but is held against rotation relative to said hollow shaft by the nut, coarse adjustment knob means directly connected with said hollow shaft for directly driving said worm gear and thereby effecting coarse adjustment of said reciprocable slide, and fine adjustment knob means carried by said screw shaft for causing said nut to move axially and carry with it the worm gear for thereby effecting fine adjustment of said reciprocable slide, and friction means operably disposed between said frame and said coarse adjusting knob means for preventing rotational movement of said hollow shaft during movement of said fine adjustment knob means, said friction clutch permitting movement of the coarse and fine adjusting means without damage thereto or to said slide even though the latter has moved to a limit of its movement.

References Cited in the file of this patent
UNITED STATES PATENTS

| | | |
|---|---|---|
| 2,148,576 | Ott | Feb. 28, 1939 |
| 2,563,702 | Benford | Aug. 7, 1951 |
| 2,669,158 | Frischmann | Feb. 16, 1954 |
| 2,747,464 | Bowerman | May 29, 1956 |
| 2,914,952 | Frischmann | Dec. 1, 1959 |

FOREIGN PATENTS

| | | |
|---|---|---|
| 409,245 | Great Britain | Apr. 26, 1934 |
| 1,163,194 | France | Apr. 21, 1958 |